(12) United States Patent
Takemura

(10) Patent No.: US 6,826,312 B1
(45) Date of Patent: Nov. 30, 2004

(54) METHOD, APPARATUS, AND RECORDING MEDIUM FOR IMAGE PROCESSING

(75) Inventor: Kazuhiko Takemura, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/359,121

(22) Filed: Jul. 23, 1999

(30) Foreign Application Priority Data

Jul. 23, 1998 (JP) .............................. 10-208110
Apr. 26, 1999 (JP) .............................. 11-117586

(51) Int. Cl.$^7$ .............................. G06K 9/20; H04N 1/46
(52) U.S. Cl. .............................. 382/282; 358/538; 358/443; 358/530
(58) Field of Search .............................. 382/254, 263–268, 382/274, 275, 282; 355/443, 448, 453; 358/530, 538, 537, 521; 345/426, 617, 690

(56) References Cited

U.S. PATENT DOCUMENTS

| | | | | | |
|---|---|---|---|---|---|
| 5,150,458 A | * | 9/1992 | Masuzaki | .................. | 395/135 |
| 5,530,494 A | * | 6/1996 | Ogawa | .................. | 351/206 |
| 5,557,325 A | * | 9/1996 | Ueda | .................. | 348/223 |
| 5,990,901 A | * | 11/1999 | Lawton | .................. | 345/429 |
| 6,069,707 A | * | 5/2000 | Pekelman | .................. | 358/1.6 |
| 6,130,932 A | * | 10/2000 | Diepstraten | .................. | 378/98.7 |
| H2003 H | * | 11/2001 | Minner | .................. | 382/254 |
| 6,397,233 B1 | * | 5/2002 | Okawa | .................. | 707/530 |
| 6,441,827 B1 | * | 8/2002 | Hori | .................. | 345/629 |

* cited by examiner

*Primary Examiner*—Jerome Grant, II
(74) *Attorney, Agent, or Firm*—Birch, Stewart, Kolasch & Birch, LLP

(57) ABSTRACT

Image data can be corrected in the same manner as by retouching work using a photograph finishing system in a laboratory. Sub-image data generating means generates sub-image data representing density information or the like of an original image from main image data representing the original image. The sub-image data are displayed on a monitor as a sub-image, and an operator carries out correction using input means while viewing the sub-image. In this manner, corrected sub-image data are obtained by retouching means. Correction means corrects the main image data based on the corrected sub-image data, and processed image data are obtained. The processed image data are reproduced as a printed image by a printer.

23 Claims, 1 Drawing Sheet

METHOD, APPARATUS, AND RECORDING MEDIUM FOR IMAGE PROCESSING

BACKGROUND OF THE INVENTION

1. Field of the Invention

The present invention relates to an image processing method and an image processing apparatus which enable an operator to correct image data in the same manner as carrying out retouching work, and also to a computer-readable recording medium storing a program to cause a computer to execute the image processing method.

2. Description of the Related Art

In order to generate higher quality images, a photograph finishing system in a laboratory carries out printing after retouching work has been carried out directly on images recorded on an original negative or reversal film. For example, in the case of portrait photographing by using a negative film, retouching is carried out on an image of a person recorded on the film with a pencil along his/her nose so that the appearance of nose is sharpened. In the case where a reversal film is used, chroma of a specific subject in an image to be printed can be emphasized by superposing a color on the film by using a dedicated coloring material.

Meanwhile, following development of computer technology in recent years, printing systems for generating printed images after carrying out appropriate processing on image data obtained by reading an image recorded on a negative or reversal film or on image data obtained by photographing with a digital camera have been proposed. In such a printing system, since printing is carried out after image processing such as tone correction, brightness correction, and white balance correction has been carried out on the image data, high quality prints can be obtained even if photographing was not completely successful.

However, in the above-described photograph finishing system in a laboratory, films are directly manipulated and an operation for the manipulation is substantially complicated. Therefore, only skilled workers can carry out satisfactory processing. It is extremely difficult for a photographer who has photographed an image to be corrected to carry out retouching work directly on a film by himself/herself, and even a skilled worker may not necessarily reflect the photographer's intention accurately in the printed image. Furthermore, although density increasing processing on a film to cause density of a printed image to become lower can be carried out, for example in the case of retouching a negative film, density decreasing processing on a film to cause density of a printed image to become higher cannot be carried out easily. Moreover, since films are manipulated directly, correction is not easily undone.

Meanwhile, image processing used in the above-described printing system is to correct entire image data by setting a parameter for tone correction or the like based on the image data. Therefore, sharpening only a person's nose or emphasizing chroma of a specific subject, which are possible by using the photograph finishing system in a laboratory, are not possible by using the printing system.

SUMMARY OF THE INVENTION

The present invention has been created based on consideration of the above problems. An object of the present invention is to provide an image processing method and an image processing apparatus for enabling correction of image data in the same manner as by a photograph finishing system in a laboratory, and a computer-readable recording medium storing a program to cause a computer to execute the image processing method.

An image processing method of the present invention comprises the steps of:

obtaining corrected sub-image data by correcting at least a portion of sub-image data representing information included in an original image represented by main image data; and obtaining processed image data by correcting the main image data based on the corrected sub-image data.

It is preferable for the image processing method of the present invention to correct the main image data only for a portion corrected in the sub-image data, based on the corrected sub-image data.

It is preferable for the corrected sub-image data to be obtained by reproducing the sub-image data on reproduction means and correcting the reproduced sub-image data.

The sub-image data may be generated from the main image data. Alternatively, in the case where the main image data have been obtained by photoelectrically reading the original image, the sub-image data may be generated by reading the original image separately from the main image data acquisition. Moreover, in the case where original images have been obtained by consecutively photographing one and the same subject, one of the original images may be the sub-image, and image data representing the sub-image can be the sub-image data.

As the sub-image data, density information of the main image data, information reversing the density information, chroma information of the main image data, and the like can be listed. However, depending on the content of a desired correction, various kinds of information can be used. When the original image is a negative image, the sub-image to be obtained by reproducing the sub-image data is a negative image. Meanwhile, when the original image is a positive image, a negative sub-image can be reproduced by reversing the density information.

The sub-image data may have a predetermined offset value. This is because the density cannot be lowered for a portion having 0 density, in the case where the density is corrected. In this case, by letting the offset value correspond to an orange color, the sub-image obtained by reproducing the sub-image data looks like an image recorded on a negative film. Furthermore, by representing the density information by the orange color, the sub-image looks like an image recorded on a negative film. Moreover, processing efficiency may be improved by letting the number of bits of the sub-image data be smaller than that of the original image data.

The corrected sub-image data and the main image data may be stored in a recording medium by relating the two.

An image processing apparatus of the present invention comprises:

corrected sub-image data generating means for obtaining corrected sub-image data by correcting at least a portion of sub-image data representing information included in an original image represented by main image data; and correction means for obtaining processed image data by correcting the main image data based on the corrected sub-image data.

It is preferable for the image processing apparatus of the present invention to correct the main image data based on the corrected sub-image data, only for a portion corrected in the sub-image data.

It is also preferable for the corrected sub-image data generating means to comprise means for generating the sub-image data from the main image data.

Furthermore, it is preferable for the corrected sub-image data generating means to comprise:

reproduction means for reproducing the sub-image data; and input means for allowing an input for correcting the reproduced sub-image data.

The processing carried out in the image processing method may be provided as a program to cause a computer to execute the processing recorded in a computer-readable recording medium.

According to the present invention, the corrected sub-image data are obtained by correcting at least a portion of the sub-image data representing density information, chroma information and the like of an original image, and the main image data are corrected based on the corrected sub-image data. Therefore, the same processing as in retouching work such as sharpening the image of a nose or emphasizing chroma of a specific subject is carried out on the sub-image data to obtain the corrected sub-image data, and based on the corrected sub-image data, the main image data are corrected. In this manner, the image obtained by reproducing the processed image data has been finished with the same processing as in the retouching work carried out by a photograph finishing system in a laboratory. By correcting the sub-image data in this manner, retouching work can be undone after generating the sub-image data again even when the correction was not successful. Therefore, a photographer can carry out the correction easily by himself/herself, and a corrected image reflecting the photographer's intention accurately can be obtained. Since density is easily increased or decreased in the sub-image data, density increase or decrease of a printed image can be carried out more easily than on a film by using a photograph finishing system. Furthermore, a portion of an image, not the entire image, can be corrected easily.

DESCRIPTION OF THE PREFERRED EMBODIMENTS

Hereinafter, embodiments of the present invention will be explained with reference to the accompanying drawings.

Figure 1:
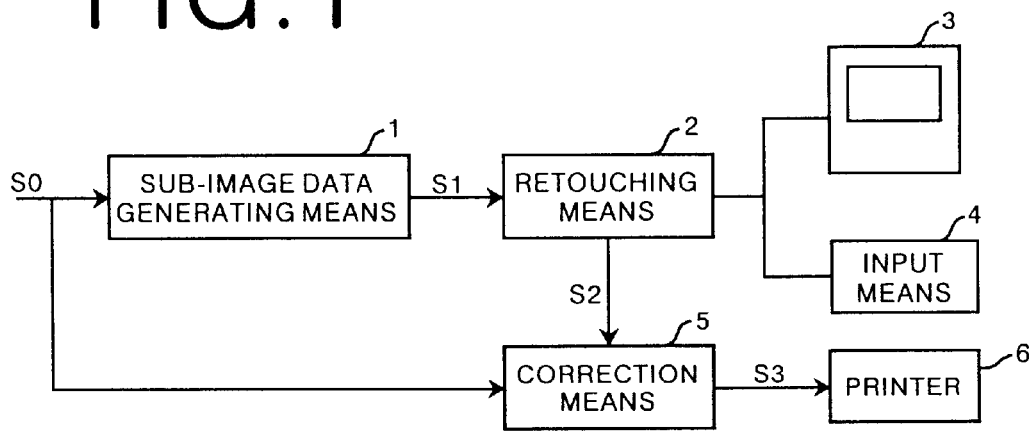
FIG. 1 is a schematic block diagram showing a configuration of a printing system using an image processing apparatus according to embodiments of the present invention.

FIG. 1 is a schematic block diagram showing a configuration of a printing system employing an image processing apparatus according to the embodiments. As shown in FIG. 1, the printing system comprises sub-image data generating means 1 for generating sub-image data S1 from original image data S0 (hereinafter, called main image data) in the manner which will be described later, retouching means 2 for displaying the sub-image data S1 on a monitor 3 and for obtaining corrected sub-image data S2 by carrying out retouching based on an input from input means 4 on a displayed image, correction means 5 for obtaining processed image data S3 by correcting the main image data S0 according to the corrected sub-image data S2, and a printer 6 for printing the processed image data S3.

The main image data S0 to be processed in the embodiments of the present invention are obtained by photoelectrically reading an image recorded on a negative or reversal film, or by photographing a subject with a digital camera.

The sub-image data generating means 1 generates the sub-image data S1 by extracting density information, chroma information, and the like from the main image data S0.

The retouching means 2 is to correct the sub-image data S1 by using retouching software. There touching means 2 obtains the corrected sub-image data S2 by reflecting the content of a correction input by an operator using the input means 4 in the displayed image while viewing the sub-image data S1 displayed on the monitor 3.

An operation of the present invention based on processing content different among the kinds of retouching will be explained next.

(First Embodiment)

The case where tone and density of an image recorded on a negative film are corrected.

Processing carried out in the case where an image represented by the main image data S0 is an image of a person, such as sharpening the person's nose, deleting wrinkles at corners of his/her eyes, or deleting a spot caused by dirt attached on the film, is the processing to be carried out here.

Figure 2:
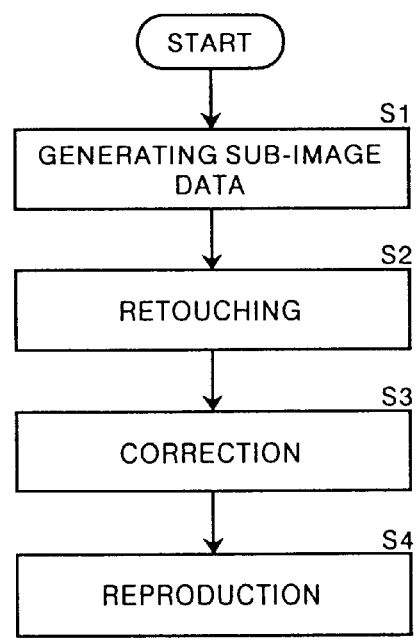
FIG. 2 is a flow chart showing processing carried out in a first embodiment.

FIG. 2 is a flow chart showing the processing carried out in a first embodiment. Hereinafter, processing flow carried out in second to fourth embodiments which will be explained later is the same as this processing flow. Therefore, only the first embodiment will be explained with reference to the flow chart.

The main image data S0 are obtained by photoelectrically reading an original image recorded on a negative film. The sub-image data generating means 1 generates the sub-image data S1 representing density information of the original image as a black-and-white image, using a base density of the negative film as an offset density (step S1). Since the base density of the negative film is orange, the offset density means data having values ranging from 20 to 70 degrees in the metric hue angle of the CIELab display system. Density information of the original image can be found by subtracting a G (green) density corresponding to a minimum density Dmin of the original image from a G density of the negative film at each pixel in the original image. In other words, when Rmin, Gmin, and Bmin denote RGB values of the original image at the minimum density Dmin, and let Ri0, Gi0, and Bi0 be pixel values in each pixel of the original image, pixel values Ri1, Gi1, and Bi1 of each pixel of a sub-image represented by the sub-image data S1 can be found by using the following equations (1):

$$Ri1 = Rmin + (Gi0 - Gmin)$$
$$Gi1 = Gi0$$
$$Bi1 = Bmin + (Gi0 - Gmin). \quad (1)$$

The sub-image data S1 obtained in this manner are reproduced on the monitor 3 as the sub-image. The reproduced sub-image data S1 includes density information in the orange base density, and are displayed as if the original image recorded on the negative film were displayed. The operator carries out retouching using the input means 4 while viewing the sub-image displayed on the monitor 3 (step S2). For example, when the operator wishes to increase brightness of a person's nose in order to sharpen the nose, retouching using black is carried out. On the contrary, when shadow is added in order to clear up features, retouching is carried out with white. Such retouching can be carried out freely on a desired portion whose density or tone need to be corrected in the original image, such as deleting crows-feet, catching light in a person's eyes, and removing dirt or a scar included in the original image. In this manner, the operator can carry out retouching on the sub-image displayed on the monitor 3 in the same manner as on a negative film with a photograph finishing system in a laboratory. Pixel values Ri2, Gi2, and Bi2 (the corrected sub-image data S2) of each pixel in the corrected sub-image are obtained by the retouching means 2 according to the following equations (2):

$$Ri2=Ri1+\Delta R$$

$$Gi2=Gi1+\Delta G$$

$$Bi2=Bi1+\Delta B \qquad (2)$$

where $\Delta R$, $\Delta G$, and $\Delta B$ are amounts of density correction, and $\Delta R=\Delta G=\Delta B$. For a portion whose sub-image data S1 have not been corrected, $\Delta R=\Delta G=\Delta B=0$.

The correction means 5 corrects the main image data S0 based on the corrected sub-image data S2, and the processed image data S3 are obtained (step S3). Pixel values Ri3, Gi3 and Bi3 of each pixel in a processed image represented by the processed image data S3 are found according to the following equations (3):

$$Ri3=Ri0+k\cdot(Ri2-Ri1)$$

$$Gi3=Gi0+k\cdot(Gi2-Gi1)$$

$$Bi3=Bi0+k\cdot(Bi2-Bi1) \qquad (3)$$

where k is a coefficient to reflect the amounts of correction in a print as an appropriate density change, and usually takes 1. The operation of the above equations (3) is carried out only on the corrected portion, that is, on the portion where the corrected sub-image data S2 have a value. For the portion which has not been corrected according to the equation (3), the values of the main image data S0 are the values of the processed image data S3.

Using a look-up table or a conversion equation, the printer 6 converts the processed image data S3 obtained in this manner into an exposure amount necessary for generating the print. In this manner, the processed image data are reproduced as the print (step S4). The printed image has the same retouching on the original image as would have been carried out by the photograph finishing system in a laboratory.

(Second Embodiment)

The case where density and tone of a positive original image are partially corrected.

Processing carried out in the case where density or tone of an original image represented by the main image data obtained by photoelectrically reading a reversal film or photographing with a digital camera is the processing to be carried out here, for example.

The sub-image data generating means 1 generates the sub-image data S1 representing density information of the original image by black and white, based on the pixel values Ri0, Gi0, and Bi0 of the original image. Let values of each pixel in a sub-image represented by the sub-image data S1 be Di. The pixel value Di can be found by $$Di=Gi0 \qquad (4)$$

or $$Di=0.2Ri0+0.7Gi0+0.1Bi0. \qquad (5)$$

The sub-image data S1 obtained in this manner are reproduced as-the sub-image on the monitor 3. The operator carries out retouching using the input means 4, while viewing the sub-image displayed on the monitor 3. For example, in the case where contrast of the original image is partially increased, or in the case where dirt or a flaw in the original image is deleted, the corrected sub-image data S2 are obtained by correcting the portion with black. A value of each pixel in a corrected image represented by the corrected sub-image data S2 are expressed by Di'. For a portion where the sub-image data S1 have not been corrected, values of the sub-image data S1 are values of the corrected sub-image data S2. In this case, the amount of correction can be easily understood when the sub-image and an image representing the correction amount (Di'-Di) added to the sub-image are displayed together on the monitor 3.

The correction means 5 carries out correction on the main image data S0, based on the corrected sub-image data S2, and the processed image data S3 are obtained. Values Ri3, Gi3, and Bi3 of each pixel in the processed image are obtained by the following equations (6):

$$Ri3=Ri0+k\cdot(Di'-Di)$$

$$Gi3=Ri0+k\cdot(Di'-Di)$$

$$Bi3=Bi0+k\cdot(Di'-Di). \qquad (6)$$

The operation of the above equations (6) is carried out on the corrected portion, that is, on the portion where the corrected sub-image data S2 have a value. For a portion which has not been corrected by the equation (6), the value of the main image data S0 are the values of the processed image data S3.

The processed image data S3 obtained in this manner are reproduced as a printed image by the printer 6, as in the first embodiment.

(Third Embodiment)

The case where the entire tone of a positive original image is corrected.

Processing carried out in the case where tone of the main image data obtained by photoelectrically reading an image on a reversal film photographed in fine weather or obtained by a digital camera is reduced as a whole is the processing to be carried out here, for example.

The sub-image data generating means 1 generates the sub-image data S1 by reversing black and white of density information of the original image, based on the pixel values of the original image data Ri0, Gi0, and Bi0. The sub-image data are obtained by fining a pixel value di' according to the following equation (7) after the value Di of each pixel represented by the density information has been found by using the above-descried equations (4) or (5):

$$di'=D\text{const}-(D\text{const}/D\text{max})\cdot Di \qquad (7)$$

where Dmax is a maximum density of the original image and assumed to be 3.0 when the maximum density is unknown, and Dconst is an offset density defining the maximum density of the sub-image and normally equal to or smaller than 0.5. The sub-image data S1 obtained by the equation (7) reverses black and white of the original image and represents a sub-image having reduced tone.

The sub-image data S1 obtained in this manner are reproduced on the monitor 3 as the sub-image. Since the sub-image data S1 have reduced tone and reversed black and white, the tone of the original image can be reduced by correcting the main data S0 by using the sub-image data S1. However, when further correction is desired, the operator carries out retouching by using the input means 4 while viewing the sub-image displayed on the monitor 3. For example, when shadow of the original image needs to be emphasized, the corresponding portion is retouched with black and the corrected sub-image data S2 are obtained. A value of each pixel of the corrected image is di'. For a portion whose sub-image data S1 have not been corrected, the value of the sub-image data S1 are the value of the corrected sub-image data S2.

The correction means 5 corrects the main image data S0 based on the corrected sub-image data S2, and the processed image data S3 are obtained. The values Ri3, Gi3 and Bi3 of each pixel of the processed image represented by the processed image data S3 are found by using the following equations (8):

$$Ri3=Ri0+k \cdot di'$$
$$Gi3=Ri0+k \cdot di'$$
$$Bi3=Bi0+k \cdot di'. \tag{8}$$

The processed image data S3 are reproduced by the printer 6 as the printed image, in the same manner as in the first embodiment.

(Fourth Embodiment)

The case where chroma of the original image is corrected.

Based on the values Ri0, Gi0, and Bi0 of each pixel in a positive original image, a chroma value Ci* in the CIE1976Lab display system is calculated as information regarding colorfulness of the original image. First, the values Ri0, Gi0, and Bi0 of each pixel are converted into tristimulous values Xi, Yi and Zi based on physiological primary colors, by using equations (9) below:

$$\begin{matrix} Xi & Ri \\ Yi= |A| \cdot & Gi \\ Zi & Bi \end{matrix} \tag{9}$$

where the matrix $|A|$ is a matrix for converting the values Ri, Gi, and Bi of each pixel into tristimulous values Xi, Yi and Zi. The matrix $|A|$ takes values shown below in the case where the main image data S0 have been obtained by a digital camera:

$$|A| = \begin{matrix} 0.4124 & 0.3576 & 0.1805 \\ 0.2126 & 0.7152 & 0.0722 \\ 0.0193 & 0.1192 & 0.9505. \end{matrix} \tag{10}$$

When the original image is a negative image, the values Ri, Gi, and Bi are obtained by subtracting the values of each pixel from 255 (in the case of 8-bit image). Values ai* and bi* of each pixel in the Lab display system are found by using the following equations (11):

$$ai^*=500\{f(Xi/Xn)-f(Yi/Yn)\}$$
$$bi^*=200\{f(Yi/Yn)-f(Zi/Zn)\} \tag{11}$$

where Xn, Yn and Zn are tristimulous values of white, and tristimulous values corresponding to a D50 light source are used. Furthermore, if Xi/Xn, Yi/Yn, Zi/Zn>0.08856, $f(ai/an)=(ai/an)^{1/3}$ and if Xi/Xn, Yi/Yn, Zi/Zn≦0.08856, f(ai/an)=7.787(ai/an)+16/116. The chroma value Ci* of each pixel is found by using the following equation (12):

$$Ci^*=(ai^{*2}+bi^{*2})^{1/2}.\text{tm} \tag{12}$$

After finding the chroma value Ci* in this manner, the magnitude of the chroma value is expressed as black-and-white density information, as in the following equation (13):

if $Ci^* \geq 1$, $Di=k \times \log(Ci^*)$, if $Ci^* < 1$, $Di=0$ \hfill (13)

where k is a coefficient for causing the chroma information to be in an appropriate range, and normally equal to 1.

The sub-image data S1 obtained in this manner are reproduced on the monitor 3. The operator carries out retouching using the input means 4 while viewing the sub-image displayed on the monitor 3. For example, a portion of the original image where chroma is emphasized is corrected with black, while with white for a portion of the original image where chroma is reduced, and the corrected sub-image data S2 are obtained. If Ci*' denotes each pixel value of the corrected sub-image represented by the corrected sub-image data S2, $$Ci^{*'}=Ci^*+\Delta C \tag{14}$$

where ΔC is the amount of correction. For a portion whose sub-image data S1 have not been corrected, ΔC=0.

The correction means 5 corrects the main image data S0 based on the corrected sub-image data s2, and processed image data S3 are obtained. The values Ri3, Gi3, and Bi3 of each pixel of the processed image represented by the processed image data S3 are found in the following manner. First, let $$\theta=\tan^{-1}(ai^*/bi^*)(0 \leq \theta < 360). \tag{15}$$

Values ai*' and bi*' changed from ai* and bi* of each pixel in the original image are found by using the following equations (16):

$$ai^{*'}=Ci^{*'} \times \cos\theta$$
$$bi^{*'}=Ci^{*'} \times \sin\theta. \tag{16}$$

Based on the values ai*' and bi*' found in this manner and on the tristimulous value Yi, the values Ri3, Gi3, and Bi3 of each pixel in the image represented by the processed image data S3 are found by using the equations (9) and (11). For a portion which has not been corrected, the values of the main image data S0 are the values of the processed image data S3.

The processed image data S3 obtained in this manner are reproduced by the printer 6 as a printed image, as in the first embodiment.

In the fourth embodiment, the metric chroma C* of the CIELab display system has been used, which can be Mancel chroma or chromaticness of NCS.

In the above-described embodiments, the main image data S0 and the sub-image data S1 have the same number of bits. However, the number of bits of the sub-image data S1 may be smaller than that of the main image data S0. For example, when the main image data S0 are 12-bit data, the sub-image data may be generated as 8-bit data. By letting the sub-image data be 8-bit data, the sub-image data are easily used by a computer available on the market, and usage of infrastructure, as in the case where the sub-image data S1 are transferred to a location remote from the main image data S0 via a LAN for example, can be promoted.

In the above embodiments, the sub-image data S1 have been generated from the original image data S0 by the sub-image data generating means 1. However, the present invention is not limited to this example, and the sub-image data S1 may be generated in advance. In this case, the sub-image data S1 may be obtained from the main image data S0. If the main image data S0 are obtained by photo-electrically reading an image recorded on a negative or a reversal film, the sub-image data S1 may be generated from image data obtained by reading the image separately from the main image data acquisition. Alternatively, in the case where a plurality of images have been obtained by consecutively photographing the same subject, one of the images can be the sub-image, and the sub-image data S1 may be generated by photoelectrically reading the sub-image. In the case where a plurality of image data sets have been obtained by consecutively photographing the same subject by using a digital camera, the sub-image data may be generated from one of the image data sets.

What is claimed is:

1. An image processing method comprising the steps of:
   displaying sub-image data representing entire information included in an original image represented by main image data, as a negative image for retouching;
   obtaining corrected sub-image data by correcting at least a portion of the sub-image data; and
   obtaining processed main image data by correcting a portion of the main image data corresponding to the sub-image data, based on the corrected sub-image data.

2. An image processing method as claimed in claim 1, wherein the main image data is corrected based on the corrected sub-image data, only for a portion corrected in the sub-image data.

3. An image processing method as claimed in claim 1 or 2, wherein the sub-image data is generated from the main image data.

4. An image processing method as claimed in claim 1, wherein the corrected sub-image data is obtained by
   reproducing the sub-image data by reproduction means; and
   correcting the reproduced sub-image data.

5. An image processing method as claimed in claim 1 or 2, wherein the corrected sub-image data are obtained by reproducing the sub-image data by reproduction means; and
   correcting the reproduced sub-image data.

6. An image processing method as claimed in claim 1, wherein said sub-image data is density information extracted from the main image data.

7. An image processing method as claimed in claim 1, wherein said sub-image data is chroma information extracted from the main image data.

8. An image processing method as claimed in claim 1, wherein said step of obtaining corrected sub-image data is performed with operator interaction while said operator views sub-image data on a display.

9. A computer-readable recording medium storing a program to cause a computer to execute image processing comprising the procedures of:
   displaying sub-image data as a negative image for retouching;
   obtaining corrected sub-image data by correcting at least a portion of sub-image data representing information included in an original image represented by main image data; and
   obtaining processed image data by correcting a portion of the main image data corresponding to the sub-image data, based on the corrected sub-image data.

10. A computer-readable recording medium as claimed in claim 9, wherein the procedure of obtaining the processed image data is a procedure of correcting the main image data based on the corrected sub-image data, only for a portion corrected in the sub-image data.

11. A computer-readable recording medium as claimed in claim 9 or 10, wherein the procedure of obtaining the corrected sub-image data includes a procedure of generating the sub-image data from the main image data.

12. A computer-readable recording medium as claimed in claim 9 or 10, wherein the procedure of obtaining the corrected sub-image data includes the procedures of:
    reproducing the sub-image data; and
    allowing an input for correcting the reproduced sub-image data.

13. A computer-readable recording medium as claimed in claim 9 or 10, wherein the procedure of obtaining the corrected sub-image includes the procedure of:
    reproducing the sub-image data; and
    allowing an input for correcting the reproduced sub-image data.

14. A computer-readable recording medium as claimed in claim 9, wherein said sub-image data is density information extracted from the main image data.

15. A computer-readable recording medium as claimed in claim 9, wherein said sub-image data is chroma information extracted from the main image data.

16. A computer-readable recording medium as claimed in claim 9, wherein said procedure of obtaining corrected sub-image data is performed with operator interaction while said operator views sub-image data on a display.

17. An image processing apparatus comprising:
    display means for displaying sub-image data as a negative image for retouching;
    corrected sub-image data generating means for obtaining corrected sub-image data by correcting at least a portion of sub-image data representing information included in an original image represented by main image data; and
    correction means for obtaining processed image data by correcting a portion of the main image data corresponding to the sub-image data based on the corrected sub-image data.

18. An image processing apparatus as claimed in claim 17, wherein the correction means corrects the main image data based on the corrected sub-image data, only for a portion corrected in the sub-image data.

19. An image processing apparatus as claimed in claim 17 or 18, wherein the corrected sub-image data generating means comprises means for generating the sub-image data from the main image data.

20. An image processing apparatus as claimed in claim 17 or 18, wherein the corrected sub-image data generating means comprises:
    reproduction means for reproducing the sub-image data; and
    input means for allowing an input for correcting the reproduced sub-image data.

21. An image processing apparatus as claimed in claim 17, wherein said sub-image data is density information extracted from the main image data.

22. An image processing apparatus as claimed in claim 17, wherein said sub-image data is chroma information extracted from the main image data.

23. An image processing apparatus as claimed in claim 17, wherein said corrected sub-image data generating means generates corrected sub-image data as a function of operator interaction while said operator views sub-image data on a display.

* * * * *